S. G. NEAL.
AIR BRAKE APPARATUS.
APPLICATION FILED JUNE 10, 1915.

1,183,103.

Patented May 16, 1916.
4 SHEETS—SHEET 1.

INVENTOR
Spencer G. Neal,
BY
his ATTORNEYS

UNITED STATES PATENT OFFICE.

SPENCER G. NEAL, OF LOS ANGELES, CALIFORNIA, ASSIGNOR TO CALIFORNIA VALVE AND AIR BRAKE COMPANY, OF LOS ANGELES, CALIFORNIA, A CORPORATION OF CALIFORNIA.

AIR-BRAKE APPARATUS.

1,183,103.  Specification of Letters Patent.  Patented May 16, 1916.

Application filed June 10, 1915. Serial No. 33,233.

*To all whom it may concern:*

Be it known that I, SPENCER G. NEAL, a citizen of the United States, resident of the city of Los Angeles, county of Los Angeles, and State of California, have invented certain new and useful Improvements in Air-Brake Apparatus, of which the following is a specification.

In my Patent No. 1,082,758, dated December 30, 1913, I have shown and described an air brake apparatus wherein upon an equalization of pressures in the train pipe and brake cylinder the triple valve will be operated to place the auxiliary reservoir in communication with the brake cylinder. This action will also take place when the train pipe pressure is reduced below the pressure in the brake cylinder. When the equalization of train pipe and brake cylinder pressures is brought about gradually and by reason of repeated service applications the auxiliary action is what is called a "service emergency" application of the brakes. When the auxiliary action is obtained by a sudden and pronounced reduction in train pipe pressure it is what is known as an "emergency" application or a "quick emergency" application.

The present invention provides means whereby the service emergency application will be prevented; the quick emergency application, however, being secured in the usual manner by a sudden and pronounced reduction in train pipe pressure.

The present invention also provides an auxiliary brake cylinder in addition to the regular service brake cylinder, said auxiliary brake cylinder being connected to the triple valve and to the regular service brake cylinder. The triple valve is provided with means whereby upon a sudden and brief reduction in train pipe pressure train pipe air will flow into said auxiliary brake cylinder and into the service brake cylinder for a temporary emergency application of the brakes. In this temporary emergency application of the brakes the air pressure in the auxiliary brake cylinder will be gradually and automatically reduced and the air pressure in the service brake cylinder will also be gradually and automatically reduced down to the normal braking pressure which would result from the same degree of reduction in train pipe pressure attained in a regular service application of the brakes. The triple valve also operates in such manner that auxiliary reservoir air will be delivered to the said auxiliary brake cylinder in the regular emergency application of the brakes.

It is also one of the objects of this invention to provide means by which the auxiliary brake cylinder may be cut off from the triple valve and connected to the regular service brake cylinder so that it will receive air from the service cylinder for all brake applications.

In my said Patent No. 1,082,758 I have shown a service reservoir adapted for augmenting the train pipe capacity. In the present invention this service reservoir is in communication with the train pipe during all service applications, but means are provided whereby when the brake cylinder pressure is equal to or above train pipe or when after an equalization between train pipe and brake cylinder the brake cylinder pressure leaks down below train pipe and augmenting reservoir pressure, the augmenting reservoir will be sealed against communication with the train pipe and will be placed in communication with the brake cylinder so that the said reservoir capacity will be added to the brake cylinder capacity and disconnected from the train pipe.

Referring to the various parts by reference characters, A designates the triple valve, B the auxiliary reservoir, C the service brake cylinder, $C^1$ the auxiliary brake cylinder, D the service reservoir, E the retaining valve and F the quick-action release valve.

The triple valve is constructed, with a few changes and modifications, precisely as shown in my aforesaid Patent No. 1,082,758 and operates precisely as described in said patent, except as modified by the changes in construction described herein.

The train pipe 1 leads into the main train pipe chamber 2 of the triple valve. Above said chamber 2 and separated therefrom by the main abutment or diaphragm 3 is an auxiliary reservoir chamber 4 in constant communication with the auxiliary reservoir through the passage 5. The abutment 3 coöperates with a hollow valve stem 6, said stem being provided with ports and valves as shown in my said patent. Beneath the main train pipe chamber 2 and separated therefrom by a cross wall 19 is a chamber 21. An equalizing abutment 24 extends across the lower side of the chamber 21 to separate said chamber from an equalizing chamber 25. Chamber 21 is connected to emergency brake cylinder chamber 41 (which will be hereinafter described) by a passage 22, so that the pressures in the said two chambers will be the same at all times. In the embodiment of the invention illustrated in the drawings the main abutment 3 is about twice as large as the equalizing abutment 24. Therefore the reduction of train pipe pressure ten pounds will cause approximately twenty pounds pressure to be built up in the brake cylinder and in the equalizing chamber 25 before there will be enough pressure beneath said equalizing abutment 24 to lift the rod 6 and close the valve 32, all of which is clearly set out in my aforesaid patent. Hollow rod 6 at its lower end screws into a hub 26 formed on the upper side of flange 27 of the equalizing abutment 24. A nut locks the hub to the stem and said nut is adapted to engage the under side of the cross wall 19 to limit the upward movement of the rod. The flange 27 is formed with a central depending hollow stem which screws into the upper end of a valve cage 28, said valve cage carrying the lower abutment flange 29 for the abutment 24. The said valve cage and rod afford communication between the equalizing chamber 25 and the train pipe chamber 2. The valve cage 28 forms a small chamber 30, the outlet of which is controlled by a valve 32 seating downwardly and having a downwardly extending stem 33 carrying a plunger 34 slidable within said valve cage 28. Said plunger 34 carries at its lower end an exhaust valve 35 which opens and closes a vent $36^a$. The valve cage 28 is also provided with passages $28^a$ below valve 32. The valve 35 coöperates with a valve seat 135. Equalizing chamber 25 is formed by casing 138 upon the lower end of which is screwed a protecting cap. Chamber 25 is in direct communication with the brake cylinder through port $25^a$ and passage 86. Train pipe chamber 2 is in direct communication with chamber $39^a$ and said chamber is in communication with emergency train pipe chamber 40 as fully described in my aforesaid patent. Emergency brake cylinder chamber 41 is in direct communication with the brake cylinder and chamber 25 through a passage $85^a$ and in this passage is arranged a check valve $85^b$ which seats toward the chamber 41. This check valve prevents the brake cylinder air entering the chamber 41, but is readily unseated by either train pipe air or auxiliary reservoir air flowing from the said chamber 41 for a temporary emergency application of the brakes, or for a regular emergency application of the brakes, as will be hereinafter described. Emergency brake cylinder chamber 41 is vented to atmosphere through passage 61 which extends through arm 59 to a central valve chamber $59^a$ which is normally in open communication with the chamber 41. As chamber 21 is in open communication with the chamber 41 said chamber 21 will also be vented to atmosphere through vent 61. As shown in my aforesaid patent a valve 53 controls communication between the auxiliary reservoir chamber 4 and the emergency brake cylinder chamber 41, said valve being carried by a yoke depending from the emergency abutment 39. Connected to this valve and moving with it through the medium of the yoke is a valve 51 which closes the vent port 61 to prevent auxiliary reservoir air escaping to the atmosphere through said vent during the regular emergency application of the brakes. Check valve $85^b$ prevents the passage of brake cylinder air from the chamber 25 to chamber 41, so that during all service applications the chamber 41 will be at atmospheric pressure. It will, therefore, be seen that with the modified form of triple valve shown and described herein there can be no service emergency application of the brakes as described in my aforesaid patent, for the reason that there can be no gradual equalization of pressures in the chamber 40 and chamber 41.

To limit the downward movement of the abutment 63 and dome 64 an adjustable stop 65 is threaded through the top of the dome and is adapted to bear on the top of the valve cage 72. The dome 64 is provided with two leak ports 79 and $79^a$ connecting the chamber 81 with the chamber $39^a$, one of said ports, $79^a$ being formed through the adjustable stop 65 so that when the said stop contacts with the top of the valve cage 72 said port will be closed. It is manifest that when the abutment 63 is depressed and port $79^a$ is closed the rate of leakage of air from chamber 81 to chamber $39^a$ is reduced, the proportion of reduction depending upon the relative sizes of the ports 79 and $79^a$. It is preferred to have the port 79 of less capacity than the port $79^a$ so that the leakage of air through said port is slow when the abutment 63 is depressed.

The quick emergency feature of the triple valve remains precisely as described in my aforesaid patent. A quick reduction in train pipe pressure reduces the pressure in chamber 39$^a$ much more rapidly than the air in supplemental chamber 81 can leak through equalizing ports 79 and 79$^a$, with the result that abutment 63 will be depressed and valve 69 opened. This permits train pipe air to pass into chamber 41, as described in my aforesaid patent, thereby lifting emergency diaphragm 39 and opening valve 53 and closing valve 51. Auxiliary reservoir air from chamber 4 will then enter chamber 41 and flow thence through passage 85$^a$, past valve 85$^b$ to the brake cylinder.

By providing the leak ports 79 and 79$^a$ the ordinary service applications of the brakes may be made without depressing the abutment 63, pressures in chambers 81 and 39$^a$ equalizing through said ports. By a sudden and brief reduction in train pipe pressure the abutment 63 will be depressed by the superior pressure in chamber 81 and will be held depressed until the pressures have equalized through the restricted leak port 79. The port 79$^a$ will be closed when the stop 65 contacts with the top of the valve cage. The downward movement of the abutment will open valve 69 and admit train pipe air to chamber 41 and thence to brake cylinder, and said valve will be held open until an equalization of pressures in chambers 81 and 39$^a$. This will result in a moderate emergency application of the brakes, and as it is accomplished by train pipe air it may be termed a train pipe emergency. The leak port 79 must be so proportioned that pressures between chambers 81 and 39$^a$ will equalize before pressure in chamber 41 has been built up to an equalization with pressure in chamber 40. Of course, if there is an equalization of pressures in these two chambers valve 53 will be opened by the upward movement of abutment 39 and the regular emergency application will occur. By providing the two leak ports and closing one upon the depression of the abutment 63 the moderate emergency application will be very positive and the equalization between the chambers 81 and 39$^a$ will be retarded and the train pipe pressure will be reduced locally by each triple to such an extent as to secure the positive serial action of the triples, all of said triples giving the positive moderate emergency application. It will be readily understood that if the leak ports between chambers 81 and 39$^a$ were completely closed upon the depression of the abutment 63 the full emergency application would be secured throughout the train as there could be no equalization of pressures in chambers 81 and 39$^a$ and valve 69 would be held open, thereby permitting train pipe pressure in chambers 40 and 41 to equalize. It is not desired, however, to secure the full emergency application except upon a proper reduction of train pipe pressure by the engineer when he desires the full emergency application of the brakes.

In order to prevent air passing back to the train pipe chamber 2 during an emergency application a check valve 32$^a$ is provided at the lower end of the valve stem 6. This valve is normally held closed by a spring, but is free to be opened by train pipe air passing downwardly through the stem 6. It is manifest that if this check valve be omitted air will pass through ports 28$^a$ around valve 32 and up through stem 6 to train pipe chamber 2 whenever the brake cylinder pressure exceeds train pipe pressure.

The service or augmenting reservoir D is connected to the train line and to the equalizing chamber 25 of the triple valve through the controlling or retaining valve E. This retaining valve during all service applications of the brakes, operates as described in my Patent No. 1,125,151, dated January 19, 1915, and consists of an outer main casing forming a large chamber 106 which is closed at its upper end by a flexible diaphragm 107, the margin of said diaphragm being clamped between an annular flange 108 on the upper end of the casing, and a cap 109. This cap 109 forms a chamber 110 above the diaphragm 107. The main chamber 106 is in communication with the train pipe through a pipe 117, said pipe receiving train pipe air through a quick release valve, which will be hereinafter described. The chamber 110 is in communication with the brake cylinder through pipe 104 and equalizing chamber 25 of the triple valve. The augmenting reservoir D is connected to the lower end of the valve casing by means of a pipe 105.

Extending upwardly through the bottom of the valve casing and into the chamber 106 is an open-ended tubular post 111 having a seat 112 formed at its upper end. Sliding on this post is a tubular valve 113 which is adapted to seat on the upper end of the post 111. This tubular valve is carried by the diaphragm 107 and is adapted to be seated and unseated from the valve seat 112 by variations in pressure in chambers 106 and 110. In the center of the diaphragm is a passage adapted to be closed by a downwardly seating valve 107$^a$, said passage communicating with the interior of the tubular valve directly above the upper open end of the post 111. Bearing on the diaphragm 107 and against the upper wall of the cap 109 is a spring 110$^a$ which normally tends to depress the diaphragm and will seat valve 113 on valve seat 112 whenever there is an equalization of pressures in the chambers 106 and 110. Threaded through the cap 109 is an adjustable stop 119. By varying the position of this stop the extent of movement of the diaphragm may be varied.

With train pipe pressure exceeding brake cylinder pressure diaphragm 107 will be maintained in its upper position and valve 107$^a$ will be held closed. This places the augmenting reservoir in communication with the train line through post 111, valve 113 and orifices 118 in the side walls of said valve. When, however, there has been an equalization of pressures in the brake cylinder and train pipe the spring will force downwardly the diaphragm and with it will go the valve 107$^a$. This operation will seal the augmenting reservoir from the train pipe and, therefore, air from the said reservoir cannot flow to the train pipe. When the brake cylinder pressure leaks down below the pressure in the augmenting reservoir, which, as heretofore noted, was sealed at an equalization of pressures in train pipe and brake cylinder, the augmenting reservoir pressure will force open valve 107$^a$ and flow to the brake cylinder through pipe 104 and chamber 25. It will, therefore, be seen that the augmenting reservoir will be connected to the train pipe for ordinary service applications, and will be connected to the brake cylinder immediately upon the brake cylinder pressure dropping below augmenting reservoir pressure. This adds a large volume of air to the brake cylinder capacity so that a small leakage therefrom will not materially affect the pressure in said cylinder. The retaining valve acts in the nature of a pneumatic switch to disconnect the augmenting reservoir from the train pipe after an equalization of train pipe and brake cylinder pressures, and to connect it to the brake cylinder when the brake cylinder pressure leaks down below the pressure in the augmenting reservoir.

The quick action release valve F operates precisely as described in my Patent No. 1,128,622, dated February 16, 1915, except that in the upper wall of the casing is arranged a hollow plug 120 carrying a spring 121, the tension of said spring being adjustable through a screw 122. In the lower end of the tubular plug is arranged a loose head 123, said head projecting through the plug and bearing upon the upper end of the valve stem 124. The purpose of this arrangement is to permit the valve to be adjusted for operation under a predetermined pressure. If it be desired to operate the quick release valve upon an increase of five or ten pounds pressure in the train pipe, the screw 122 is adjusted to bring the required pressure on the valve rod and through said rod on the diaphragm 125.

The train pipe 1 is connected to the quick release valve through pipe 117$^a$; and said valve is connected to the retaining valve through pipe 117. The auxiliary reservoir is connected to the quick release valve through pipe 117$^b$. When the graduated release feature of the triple valve is to be availed of the valve 117$^c$ is closed, said valve corresponding to valve 34 in my aforesaid Patent No. 1,128,622.

Figure 3:
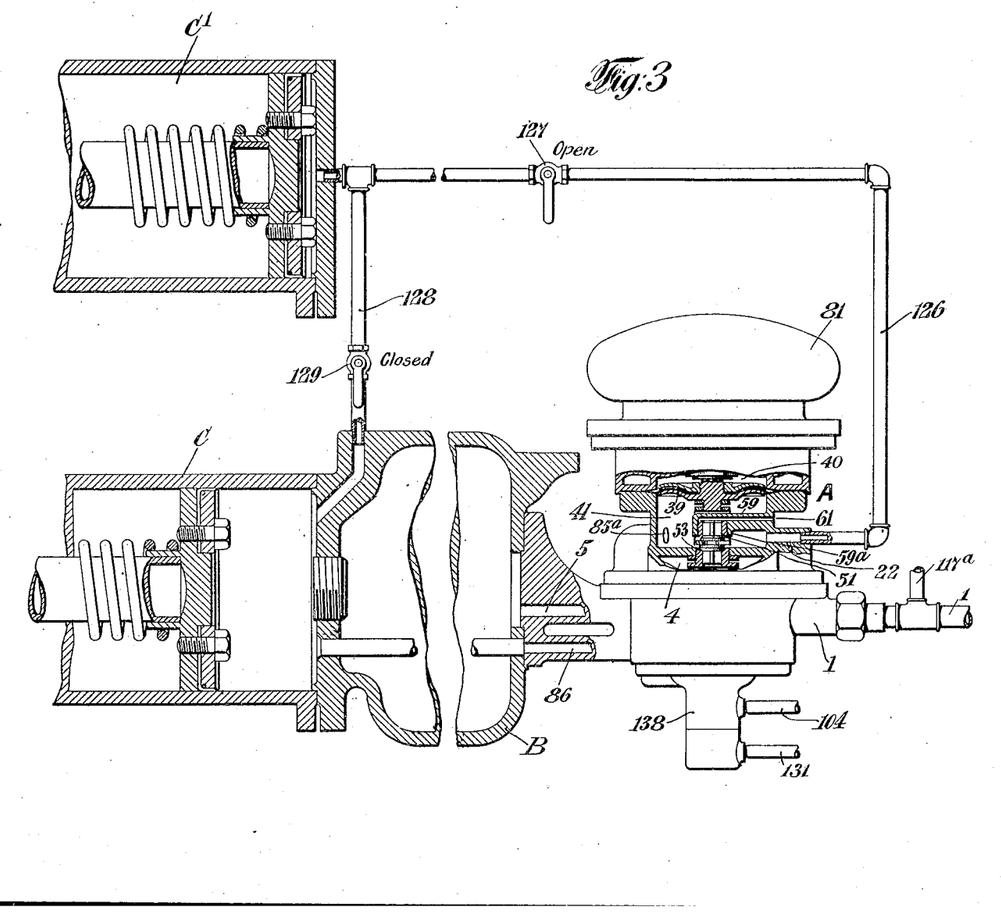
Fig. 3 shows the apparatus provided with an auxiliary brake cylinder in addition to the regular service brake cylinder.
Figure 4:
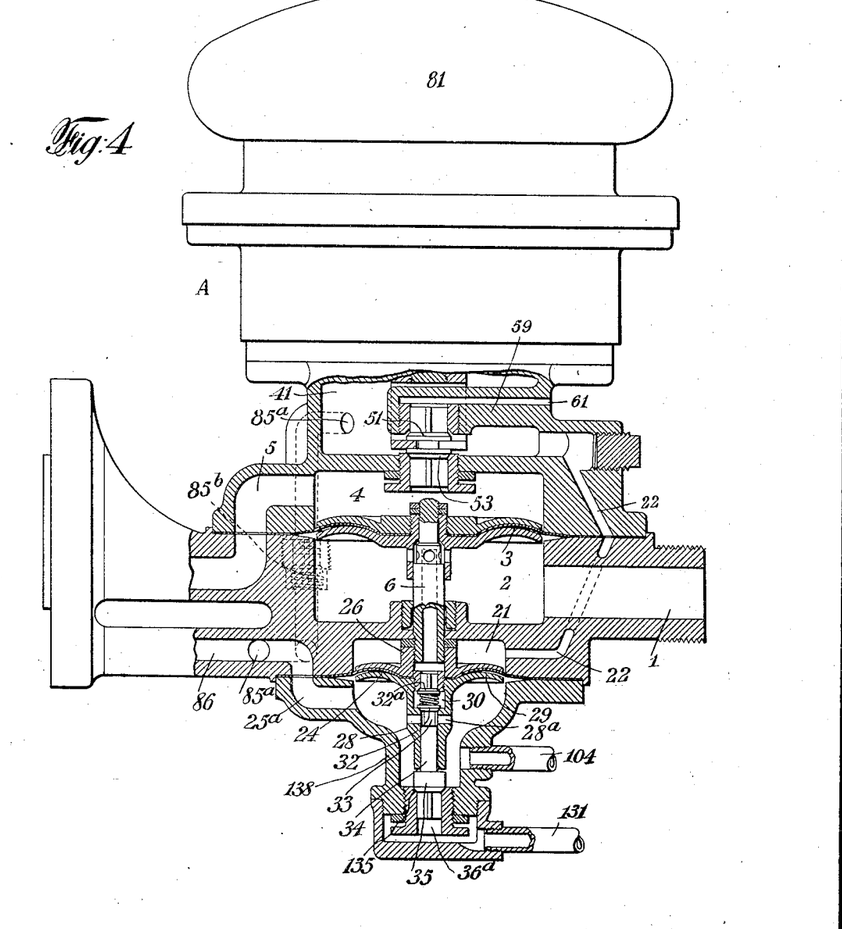
Fig. 4 an enlarged vertical sectional view of a portion of the triple valve.

As shown in Fig. 3, the apparatus is provided with an auxiliary brake cylinder C$^1$. This cylinder is connected to the emergency brake cylinder chamber 41 by a pipe 126, said pipe being provided with a valve 127. This valve may be closed to cut off communication with the brake cylinder C$^1$ and the chamber 41. The service brake cylinder C is connected to the auxiliary brake cylinder by a pipe 128; and this pipe is provided with a valve 129 which is adapted to be closed to cut off communication between the two brake cylinders. When the auxiliary brake cylinder C$^1$ is to be used in emergency applications only it is charged from chamber 41, valve 129 being closed and valve 127 being open. When the auxiliary brake cylinder is to be used during all braking operations valve 127 is closed and valve 129 is open and said cylinder will then receive its air from the service brake cylinder C.

Figure 5:
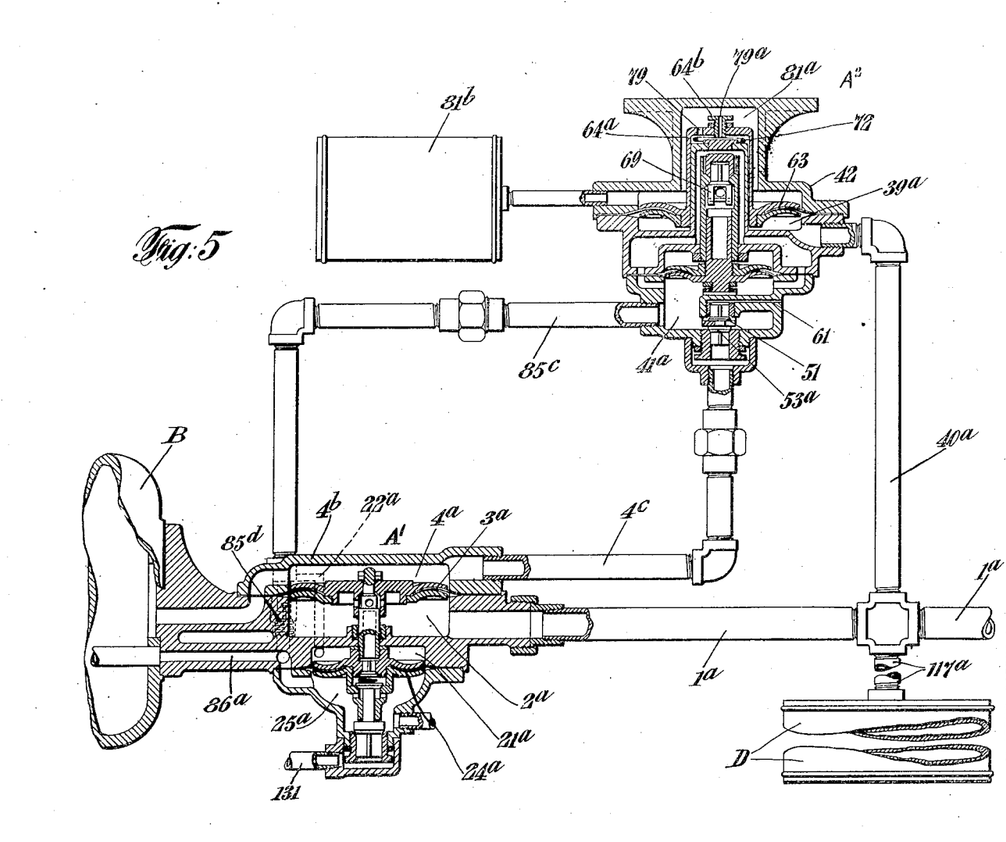
Fig. 5 a sectional view of the triple valve arranged as two separate devices.

When the auxiliary or second brake cylinder is connected to the vented emergency brake cylinder chamber 41, a moderate temporary emergency application may be secured in said cylinder by a sudden and brief reduction in train pipe pressure. The air for this temporary emergency application is taken from the train pipe so that it may be properly called a train pipe emergency application to distinguish it from the regular emergency application where in the air is discharged from the auxiliary reservoir into the brake cylinder. By a sudden and brief reduction of train pipe pressure valve 69 will be opened suddenly and for a brief period, permitting train pipe air to pass to chamber 41 and through said chamber to the two brake cylinders. The reduction in train pipe pressure must be sudden and brief as to time in order to prevent a building up of pressure in chamber 41 equal to the pressure in chamber 40, as heretofore described. The air will flow from chamber 41 to the auxiliary brake cylinder, and through passage 22 to chamber 21. The air will also pass through valved passage 85$^a$ to the service brake cylinder and to chamber 25, so that the pressures above and below equalizing abutment 24 are equalized. The pressure in both brake cylinders will be above the normal service braking pressure which would be obtained through the same degree of reduction in train pipe pressure in the regular service application of the brakes. The pressure in the auxiliary brake cylinder and in chamber 1 immediately begins to independent structures, one of said structures containing the parts by which the service applications of the brakes are secured and through which the release of the brakes is obtained; the other containing the parts which control the emergency applications of the brakes. This novel arrangement of parts results in many advantages, which will appear hereinafter. The parts of the apparatus for securing the service applications of the brakes and the release of the brakes are in one complete casing $A^1$; and the parts of the apparatus through which the emergency applications of the brakes are secured are in a casing $A^2$. These two casings are independently supported and may be placed side by side or in any other relation to each other. The object of this is to reduce the height and weight of the triple valve casing, and also to make it possible to more readily and quickly locate any trouble in the operation of the various devices. It is manifest that the parts in either casing $A^1$ or $A^2$ may be examined without in any way disturbing the parts in the other casing.

Figures 1, 2:
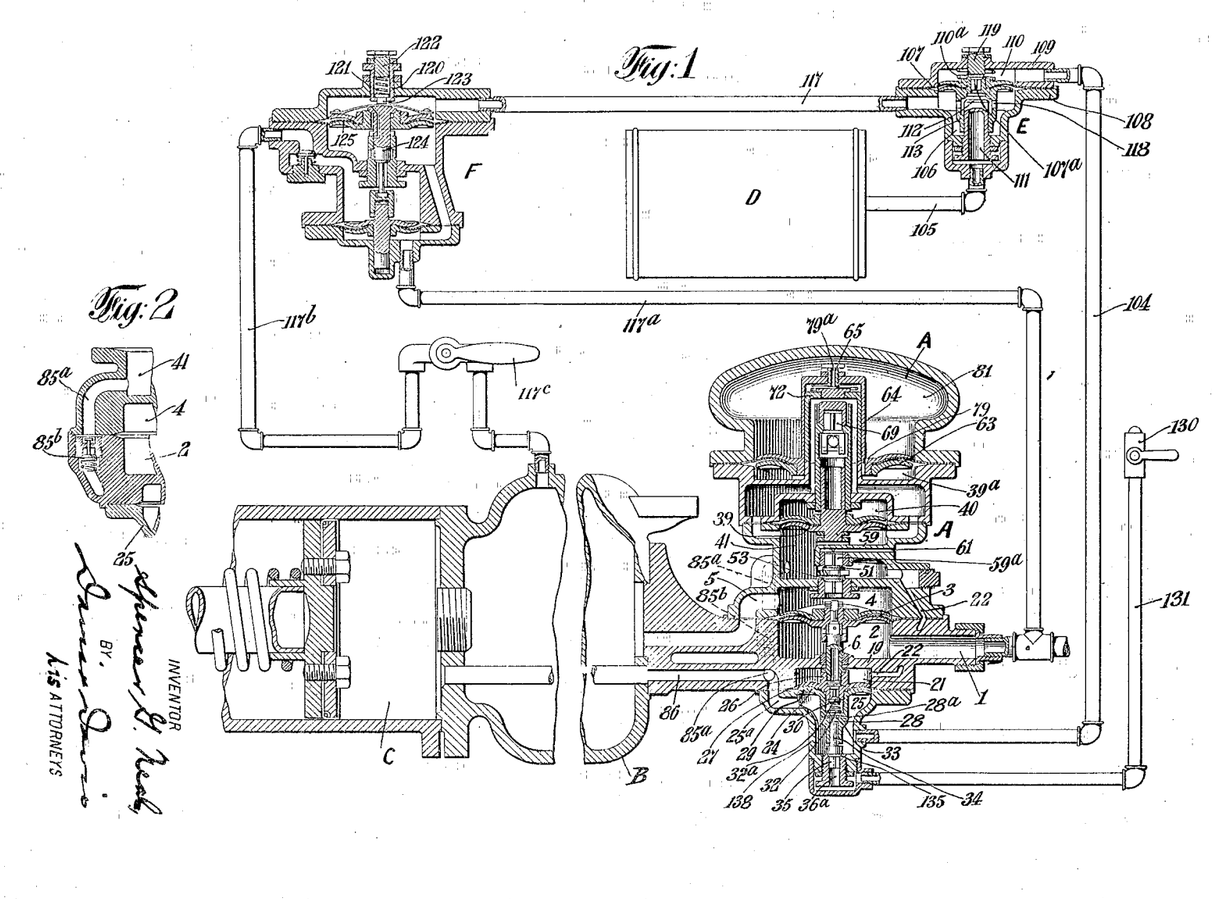
Figure 1 is a vertical sectional view of the apparatus constituting one braking unit.
Fig. 2 a detail sectional view of a portion of the triple valve.

As shown in Fig. 5 the auxiliary reservoir chamber $4^a$ is provided with a rigid top plate $4^b$, said plate also forming the top of the casing $A^1$. In this casing is located the main abutment $3^a$ forming the train pipe chamber $2^a$, to which is connected the train pipe $1^a$. The equalizing chamber $25^a$ and the equalizing abutment $24^a$ operate precisely as shown in Fig. 1. The train pipe $1^a$ is connected to the train pipe chamber precisely as shown in Fig. 1.

In the casing $A^2$ is mounted all of the parts which operate during the emergency application of the brakes. The supplemental chamber is reduced in size to form the small contracted chamber $81^a$, said chamber being provided with flanges by means of which the casing may be secured in position. Connected to the chamber $81^a$ is a supplemental reservoir $81^b$ which supplies the air capacity for the chamber $81^a$. In the form of the apparatus shown in Fig. 1 the chamber 81 is large and in order to provide the same air capacity for the small or contracted chamber $81^a$ the small reservoir $81^b$ is connected thereto. The brake cylinder chamber $41^a$ is connected by a pipe $85^c$ to the brake cylinder passage $86^a$, the said passage being provided with a check valve $85^d$ (like valve $85^b$ shown in Fig. 2), to prevent brake cylinder air passing back through the pipe $85^c$. Auxiliary reservoir chamber $4^a$ is connected by pipe $4^c$ with the emergency brake cylinder chamber $41^a$, and the chamber $21^a$ is connected to the pipe $85^c$ by a passage $22^a$ formed in the casing $A^1$. Valve $53^a$ controls communication between said chambers precisely as described in connection with Fig. 1.

It is manifest that the two casings $A^1$ and $A^2$ may be located in any desired positions and the respective chambers thereof properly connected together by pipes, as shown in Fig. 5. It is also manifest that by this arrangement of parts the amount of so-called "head room" required for the triple is reduced practically 50 per cent. This is desirable.

If desired, the ordinary hand-operated retainer valve 130 may be connected to the triple valve through pipe 131, said pipe being necessarily connected to the triple in such manner as to receive air from the brake cylinder exhaust valve 35.

With a triple valve constructed as described herein, when train pipe pressure is above the point of equalization of train pipe and brake cylinder pressures all the air leaks from the brake cylinders will be compensated for automatically, the superior pressure in chamber 4 depressing diaphragm 3 and opening the valve 32, thereby permitting air to flow from the train pipe into the brake cylinder to compensate for said leaks. When brake cylinder and train pipe are below the equalization pressure, brake cylinder leaks may be compensated for by the engineer admitting air to the train pipe, this air operating the triple and flowing into the brake cylinder. This may be continued until equalization pressure is reached. When the train pipe pressure has been raised to an equality with the pressure in chamber 4, or slightly in excess of said pressure, the release operations begin. By raising the train pipe pressure intermittently, or by steps, after equalization of pressures in train pipe and brake cylinder a graduated release is obtained, and by steadily increasing said pressure a full release is obtained. It is manifest that at all times after an equalization of pressures in the brake cylinder and train pipe, the brake cylinder pressure may be maintained equal to the train pipe pressure up to the point of equalization of the pressures.

There are many other important advantages resulting from the construction of air brake apparatus described herein, but it is thought unnecessary to set forth those advantages in detail in this specification.

The retaining valve described herein has been made the subject matter of a separate application; and all other parts of the apparatus shown and described but not claimed herein will be claimed in separate applications, and the failure to make a claim herein for any part of the apparatus is not to be taken as an abandonment of my right to make such claim either herein or in a separate application.

What I claim is:

1. A triple valve provided with a main train pipe chamber, an equalizing chamber leak down through passage 61. Pressure in chamber 21 also leaks down through passage 22, chamber 41 and passage 61. The result of this is that the higher pressure in chamber 25 raises the abutment 24 and opens the exhaust valve 35, thereby permitting the pressure in the main brake cylinder to leak down with the pressure in the supplemental brake cylinder. The pressures in the two cylinders will go down together until the pressure in the service brake cylinder and chamber 25, plus the train pipe pressure in chamber 2, permits the auxiliary reservoir pressure to close the exhaust valve and the valve 33. The pressure in the main or service brake cylinder will then be held, while the air in the supplemental brake cylinder and in chambers 21 and 41 will leak down to atmosphere. It will thus be obvious that a temporary emergency application may be secured which will be effective for only a brief period, the air in the auxiliary brake cylinder leaking down, while the regular service pressure will be maintained in the service brake cylinder. The regular emergency application, as hereinbefore described, can be obtained by a sudden reduction of train pipe pressure and an equalization of pressures in chambers 40 and 41 in order to open valve 53 and permit auxiliary reservoir air to discharge into chamber 41 and then into the brake cylinders.

The provision of the auxiliary cylinder and means in the triple valve operated by a sudden and brief reduction in train pipe pressure to produce a temporary emergency application is entirely new in braking operations. This is made possible in the construction described herein by the provision of the emergency brake cylinder chamber 41 which is normally vented to atmosphere. This temporary emergency application is of great advantage when it is desired to bring the train to a sudden stop while at the same time it is undesirable to maintain the brakes applied under the pressure of the regular emergency application. It is also desirable at times to apply the brakes suddenly and with considerable force and to then gradually reduce that braking pressure. When a heavy train is traveling at a high speed it requires great braking power to check its speed, but that braking power becomes excessive as the speed of the train is reduced and results in the locking of the car wheels and the consequent sliding of the wheels on the rails. By providing the chamber 41 and the auxiliary brake cylinder a sudden and great pressure may be applied to the brakes and this pressure will gradually be reduced, and excessive braking pressure prevented, as the speed of the train is reduced. The air in the regular service brake cylinder will be maintained at the normal service braking pressure and will not be affected by the leakage from the auxiliary brake cylinder through port 61. By providing the auxiliary brake cylinder and connecting it to emergency brake cylinder chamber 41, the braking power is practically doubled upon a sudden and brief reduction in train pipe pressure, and this doubled pressure is gradually automatically reduced to ordinary service braking pressure in the one cylinder C.

The auxiliary brake cylinder arrangement shown in Fig. 3 adapts the braking apparatus for freight service and for passenger service. It provides what is known as a "no load—full load equipment," for freight service. By closing the valves 127 and 129 the single brake cylinder C may be used as a "no-load equipment", giving a single brake cylinder for service and emergency braking operations. By closing valve 127 and opening valve 129 the apparatus is a full-load equipment in which both brake cylinders will be used in service applications and in emergency applications. For passenger service it is more desirable to close valve 129 and open valve 127. This arrangement gives cylinder C for ordinary service braking. With valve 129 closed and valve 127 open, emergency applications will be secured from cylinders C and C¹, auxiliary reservoir air passing to cylinder C through passage 85ª from chamber 41, and passing to the auxiliary cylinder C¹ through pipe 126 from chamber 41.

After an emergency application of the brakes there will be an equalization of pressures in chambers 4, 21, 25 and 41 resulting from an equalization of pressures in the auxiliary reservoir and brake cylinder. The pressure in chamber 21 equalizes and balances the pressure in chamber 25 so that upon a release of the brakes after an emergency application the train pipe pressure in chamber 2 must be raised to overcome pressure in auxiliary reservoir chamber 4. The pressure in chamber 41 will be reduced with the pressure in chamber 25, when exhaust valve 34 is opened, and the pressure in chamber 40 will then overcome pressure in chamber 41 and valve 53 thereby will be seated, preventing further escape of air from chamber 4. When valve 53 is seated vent 61 will be opened to atmosphere so that pressures in chambers 21 and 41 will then be reduced to atmospheric pressure. The graduated release of the brakes after a service application may be secured in the same manner as described in my Patent No. 1,082,758, an increase in train pipe pressure opening exhaust valve 35, said valve being closed when the pressure in chamber 25 has been sufficiently reduced by the exhaust to permit pressure in chamber 4 to move abutment 3 against the pressure in train pipe chamber 2.

In Fig. 5 the parts which control all of the braking operations are arranged as two adapted to be placed in direct communication with a brake cylinder, an auxiliary reservoir chamber adapted to be placed in direct communication with an auxiliary reservoir, an emergency brake cylinder chamber, means to permit air to flow from said emergency brake cylinder chamber to the brake cylinder, said means preventing air flowing from the brake cylinder back to said chamber, means operated by a decrease in train pipe pressure to place the train pipe chamber in communication with the equalizing chamber for a service application of the brakes, and means operated by a sudden decrease in train pipe pressure to place the auxiliary reservoir chamber in communication with the emergency brake cylinder chamber for an emergency application of the brakes.

2. A triple valve provided with a train pipe chamber, an equalizing chamber adapted to be placed in direct communication with a brake cylinder, an auxiliary reservoir chamber adapted to be placed in communication with an auxiliary reservoir, means operated by variations in train pipe pressure to admit air into the equalizing chamber and to exhaust it from the brake cylinder, means for feeding air from the train pipe chamber into the auxiliary reservoir chamber, an emergency brake cylinder chamber normally vented to atmosphere, means placing the emergency brake cylinder chamber in communication with the brake cylinder to permit air to pass from said chamber to said cylinder, said means preventing air passing back from the brake cylinder to said chamber, and means operated by a sudden reduction in train pipe pressure for opening communication between the auxiliary reservoir chamber and the emergency brake cylinder chamber for an emergency application of the brakes, said means operating to close the vent from said chamber.

3. A triple valve formed with a train pipe chamber, an equalizing chamber, an auxiliary reservoir chamber, an emergency brake cylinder chamber, means for placing the emergency brake cylinder chamber in communication with the equalizing chamber, a check valve to prevent air passing from the equalizing chamber to the emergency brake cylinder chamber, means operated upon a slow reduction of train pipe pressure to place the train pipe chamber in communication with the equalizing chamber, and means operated by a quick reduction in train pipe pressure to place the auxiliary reservoir chamber in communication with the emergency brake cylinder chamber.

4. A triple valve formed with a train pipe chamber, an equalizing chamber, an auxiliary reservoir chamber, an emergency brake cylinder chamber, means for placing the emergency brake cylinder chamber in communication with the equalizing chamber, a check valve to prevent air passing from the equalizing chamber to the emergency brake cylinder chamber, means operated upon a slow reduction of train pipe pressure to place the train pipe chamber in communication with the equalizing chamber, and means operated by a quick reduction in train pipe pressure to place the auxiliary reservoir chamber in communication with the emergency brake cylinder chamber, means for normally venting the emergency brake cylinder chamber, and means to close said vent when communication is open between the auxiliary reservoir chamber and said emergency brake cylinder chamber.

5. A triple valve formed with a train pipe chamber, an equalizing chamber, an auxiliary reservoir chamber, an emergency brake cylinder chamber, means for placing the emergency brake cylinder chamber in communication with the equalizing chamber, a check valve to prevent air passing from the equalizing chamber to the emergency brake cylinder chamber, means operated upon a slow reduction of train pipe pressure to place the train pipe chamber in communication with the equalizing chamber, means operated by a quick reduction in train pipe pressure to place the auxiliary reservoir chamber in communication with the emergency brake cylinder chamber, and a valve in the equalizing chamber to close communication between said chamber and the train pipe chamber when the pressure in the equalizing chamber exceeds the pressure in the train pipe chamber.

6. An air brake apparatus comprising a train pipe, a brake cylinder, an auxiliary reservoir and a triple valve provided with means operated by a slow reduction of train pipe pressure to admit air from the train pipe to the brake cylinder until the brake cylinder and train pipe pressures are equalized, said means permitting a further slow reduction in train pipe pressure without changing the air pressure in the brake cylinder, and means whereby a sudden reduction of train pipe pressure will place the auxiliary reservoir in communication with the brake cylinder.

7. An air brake apparatus comprising a train pipe, an auxiliary reservoir, a brake cylinder and a triple valve provided with means operating upon a slow reduction in train pipe pressure to place the train pipe in communication with the brake cylinder for a service application of the brakes, means controlling communication between the auxiliary reservoir and the brake cylinder said means responding only to a sudden reduction in train pipe pressure to open communication between the auxiliary reservoir and brake cylinder for an emergency application of the brakes.

8. An air brake apparatus comprising a train pipe, a service brake cylinder, an auxiliary brake cylinder, an auxiliary reservoir and a triple valve provided with a normally vented emergency brake cylinder chamber, means connecting the auxiliary brake cylinder to said emergency brake cylinder chamber, means in the triple valve to connect the service brake cylinder with the train pipe upon a reduction of train pipe pressure, means in the triple operated by a sudden and brief reduction in train pipe pressure to place the train pipe in communication with the emergency brake cylinder chamber for a temporary emergency application of the brakes.

9. An air brake apparatus comprising a train pipe, a service brake cylinder, an auxiliary brake cylinder, an auxiliary reservoir and a triple valve provided with a normally vented emergency brake cylinder chamber, means connecting the auxiliary brake cylinder to said emergency brake cylinder chamber, means in the triple valve to connect the service brake cylinder with the train pipe, upon a reduction of train pipe pressure, means in the triple operated by a sudden and brief reduction in train pipe pressure to place the train pipe in communication with the emergency brake cylinder chamber for a temporary emergency application of the brakes, said means operating upon a sudden and prolonged reduction in train pipe pressure to place the auxiliary reservoir in communication with the emergency brake cylinder chamber and seal the vent from said chamber for an emergency application of the brakes.

10. An air brake apparatus comprising a train pipe, a service brake cylinder, an auxiliary brake cylinder, an auxiliary reservoir and a triple valve provided with a normally vented emergency brake cylinder chamber, means connecting the auxiliary brake cylinder to said emergency brake cylinder chamber, means in the triple valve to connect the service brake cylinder with the train pipe upon a reduction of train pipe pressure, means in the triple valve operated by a sudden reduction in train pipe pressure to admit air under pressure to the emergency brake cylinder chamber to charge the auxiliary brake cylinder.

11. An air brake apparatus comprising a train pipe, a service brake cylinder, an auxiliary brake cylinder, an auxiliary reservoir and a triple valve provided with a normally vented emergency brake cylinder chamber, means connecting the auxiliary brake cylinder to said emergency brake cylinder chamber, means in the triple valve to connect the service brake cylinder with the train pipe upon a reduction of train pipe pressure, means in the triple valve operated by a sudden reduction in train pipe pressure to admit air under pressure to the emergency brake cylinder chamber to charge the auxiliary brake cylinder and means to permit air to pass from the emergency brake cylinder chamber to the service brake cylinder, said means preventing air passing from the service brake cylinder back to the said emergency brake cylinder chamber.

12. An air brake apparatus comprising a train pipe, a service brake cylinder, an auxiliary brake cylinder, an auxiliary reservoir and a triple valve operating upon a reduction in train pipe pressure to place the train pipe in communication with the service brake cylinder for service applications by train pipe pressure alone and upon a sudden and prolonged reduction in train pipe pressure to place the auxiliary reservoir in communication with the service brake cylinder for emergency applications alone, and means controlling communication between the service brake cylinder and the auxiliary brake cylinder.

13. An air brake apparatus comprising a train pipe, a service brake cylinder, an auxiliary brake cylinder, a triple valve provided with means operating upon a reduction of train pipe pressure to place the train pipe in communication with the service brake cylinder for all service applications by train pipe pressure alone, and means controlling communication between the service brake cylinder and the auxiliary brake cylinder.

14. An air brake apparatus comprising a train pipe, a service brake cylinder, an auxiliary brake cylinder, a triple valve provided with means operating upon a sudden and brief reduction in train pipe pressure to place the train pipe in communication with both brake cylinders for a temporary emergency application of the brakes, means in the triple valve operating upon an increase of train pipe pressure to release air from the brake cylinders, and means in the triple valve to permit air to leak from the auxiliary brake cylinder.

15. An air brake apparatus comprising a train pipe, a service brake cylinder, an auxiliary brake cylinder, an auxiliary reservoir and a triple valve operating upon a reduction in train pipe pressure to place the train pipe in communication with the service brake cylinder and upon a sudden reduction in train pipe pressure to place the auxiliary reservoir in communication with the service brake cylinder and the auxiliary brake cylinder, means controlling communication between the auxiliary brake cylinder and the service brake cylinder, and means controlling communication between the auxiliary brake cylinder and the triple valve, whereby the auxiliary brake cylinder may be used in service and emergency applications of the brakes, or only in emergency applications of the brakes.

16. An air brake apparatus comprising a train pipe, a service brake cylinder, an auxiliary brake cylinder, an auxiliary reservoir, a triple valve operating upon a reduction in train pipe pressure to place the train pipe in communication with the brake cylinders, means whereby the auxiliary brake cylinder may be supplied with air from the service brake cylinder for service and emergency applications of the brakes, and means whereby said auxiliary brake cylinder may receive air from the triple valve for emergency applications of the brakes only.

17. A triple valve comprising a train pipe chamber, an equalizing chamber in direct communication with a brake cylinder, an auxiliary reservoir chamber, means operated by a decrease in train pipe pressure to admit air into the equalizing chamber and the brake cylinder, means operated by an increase in train pipe pressure to exhaust air from the equalizing chamber and the brake cylinder, means for feeding air from the train pipe chamber into the auxiliary reservoir chamber, and means whereby the pressure in the train pipe chamber will be assisted by the pressure in the equalizing chamber to release air from the said equalizing chamber and the brake cylinder.

18. A triple valve provided with a train pipe chamber, an auxiliary reservoir chamber, a movable abutment forming the wall between said chambers, an equalizing chamber in direct communication with a brake cylinder, a movable abutment forming the upper wall of said equalizing chamber, said abutment being smaller in area than the abutment between the train pipe chamber and the auxiliary reservoir chamber, means operated by a decrease in train pipe pressure to admit air from the train pipe chamber to the equalizing chamber and brake cylinder, means operated by an increase in train pipe pressure for exhausting air from the equalizing chamber and brake cylinder, and means connecting the two movable abutments whereby the air pressure in the equalizing chamber will assist the pressure in the train pipe chamber in opening the exhaust from the equalizing chamber.

19. A triple valve formed with a chamber adapted to be placed in communication with a train pipe, a supplemental chamber, a movable abutment between said chambers, means permitting a leakage between said chambers, means for restricting the amount of said leakage without a complete stoppage thereof when the abutment is moved by a superior pressure in the supplemental chamber, means operated by the movable abutment to release train pipe air, an abutment in the triple valve adapted to be moved by said released train pipe air, a valve operatively connected to said abutment and controlling communication between the auxiliary reservoir and the brake cylinder and adpted to be opened by the movement of said connected abutment for an emergency application of the brakes.

20. In an air brake apparatus a casing, means therein operating upon a reduction in train pipe air pressure to admit train pipe air to a brake cylinder for a service application of the brakes, means therein operating upon an increase of train pipe air pressure to release air from a brake cylinder, an independent casing, means therein operating upon a sudden reduction in train pipe air pressure to admit air to a brake cylinder from the train pipe and a separate source of supply for an emergency application of the brakes.

21. An air brake apparatus comprising a train pipe, a brake cylinder, an auxiliary reservoir, a valve casing, means therein operating upon a reduction in train pipe pressure to admit air to the brake cylinder for a service application of the brakes, means therein operating upon an increase of train pipe pressure to release air from the brake cylinder, an independent casing, means connecting said casing to the auxiliary reservoir, and means operating upon a sudden reduction in train pipe pressure to place the auxiliary reservoir in communication with the brake cylinder for an emergency application of the brakes.

22. A triple valve comprising two independent casings, means in one of said casings to control train pipe air for all service applications of the brakes and the release of the brakes, and means in the other casing to control train pipe and auxiliary reservoir air for all emergency applications of the brakes.

23. An air brake apparatus comprising a train pipe, a service brake cylinder, an auxiliary brake cylinder, a triple valve provided with means operating upon a service reduction of train pipe pressure to place the train pipe in communication with the service brake cylinder only for a service application of the brakes by train pipe pressure only, and means operating upon a sudden and prolonged reduction of train pipe pressure to establish communication between the auxiliary reservoir, service brake cylinder and auxiliary brake cylinder.

24. A triple valve formed with a train pipe chamber, an equalizing chamber, an auxiliary reservoir chamber, an emergency brake cylinder chamber, means for placing the emergency brake cylinder chamber in communication with the equalizing chamber, a check valve to prevent air passing from the equalizing chamber to the emergency brake cylinder chamber, means operated upon a slow reduction of train pipe pressure to place the train pipe chamber in communication with the equalizing chamber, and means operated by a sudden and brief reduction in train pipe pressure to place the train pipe in communication with the emergency brake cylinder chamber.

25. An air brake apparatus comprising a train pipe, a brake cylinder, an auxiliary reservoir, a triple valve provided with a normally vented emergency brake cylinder chamber, means connecting the brake cylinder to said emergency brake cylinder chamber, means in the triple valve to connect the brake cylinder with the train pipe upon a reduction of train pipe pressure, and means in the triple valve operated by a sudden and brief reduction in train pipe pressure to place the train pipe in communication with the brake cylinder through the emergency brake cylinder chamber for a temporary emergency application of the brakes.

26. An air brake apparatus comprising a train pipe, a brake cylinder, an auxiliary reservoir, a triple valve provided with a normally vented emergency brake cylinder chamber, means connecting the brake cylinder to said emergency brake cylinder chamber, means in the triple valve to connect the brake cylinder with the train pipe upon a reduction of train pipe pressure, means in the triple valve operated by a sudden and brief reduction in train pipe pressure to place the train pipe in communication with the brake cylinder through the emergency brake cylinder chamber for a temporary emergency application of the brakes, and means in the triple valve automatically operating to reduce the air pressure in the brake cylinder after a temporary emergency application of the brakes.

27. An air brake apparatus comprising a train pipe, a service brake cylinder, an auxiliary brake cylinder, a triple valve provided with means operating upon a sudden and brief reduction in train pipe pressure to place the train pipe in communication with both brake cylinders, means in the triple valve operating upon an increase of train pipe pressure to release air from the brake cylinders, means in the triple valve to permit air to leak from the auxiliary brake cylinder, and means in the triple valve to permit air to leak from the service brake cylinder until the normal service braking pressure due to the train pipe pressure reduction is reached in said service brake cylinder.

28. An air brake apparatus comprising a train pipe, a brake cylinder, an auxiliary reservoir, a triple valve, means in the triple valve operating upon a slow reduction of train pipe pressure to place the train pipe in communication with the brake cylinder for a service application of the brakes, means operating upon a sudden and brief reduction in train pipe pressure to place the train pipe in communication with the brake cylinder for a temporary emergency application of the brakes, and means in the triple valve automatically operating to reduce the pressure in the brake cylinder to the service braking pressure normally resulting from the reduction in the train pipe pressure.

In testimony whereof I hereunto affix my signature.

SPENCER G. NEAL.

Copies of this patent may be obtained for five cents each, by addressing the "Commissioner of Patents, Washington, D. C."